US009162728B2

(12) United States Patent
Shiraishi et al.

(10) Patent No.: US 9,162,728 B2
(45) Date of Patent: Oct. 20, 2015

(54) SADDLE TYPE VEHICLE

(71) Applicant: YAMAHA HATSUDOKI KABUSHIKI KAISHA, Iwata-shi, Shizuoka (JP)

(72) Inventors: Takushiro Shiraishi, Shizuoka (JP); Makoto Kobayashi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/316,841

(22) Filed: Jun. 27, 2014

(65) Prior Publication Data
US 2015/0008062 A1  Jan. 8, 2015

(30) Foreign Application Priority Data

Jul. 2, 2013  (JP) ................................. 2013-139094

(51) Int. Cl.
*B62K 11/04* (2006.01)
*B62K 25/28* (2006.01)
*F02M 35/16* (2006.01)

(52) U.S. Cl.
CPC .............. *B62K 25/283* (2013.01); *B62K 11/04* (2013.01); *B62K 25/286* (2013.01); *F02M 35/162* (2013.01); *F01N 2590/04* (2013.01)

(58) Field of Classification Search
CPC ............................ B62K 25/283; B62K 11/04
USPC ................................................. 180/227, 219
See application file for complete search history.

(56) References Cited

U.S. PATENT DOCUMENTS

| 4,445,585 | A  | * | 5/1984  | Imani ............................ 180/68.5 |
| 4,463,964 | A  | * | 8/1984  | Takayanagi et al. .......... 280/284 |
| 4,515,236 | A  | * | 5/1985  | Kanamori ...................... 180/227 |
| 4,781,264 | A  | * | 11/1988 | Matsuzaki et al. ............. 180/219 |
| 6,189,638 | B1 | * | 2/2001  | Ito et al. ......................... 180/227 |
| 6,290,017 | B1 | * | 9/2001  | Ito .................................. 180/227 |
| 6,845,836 | B2 | * | 1/2005  | Inaoka et al. ................. 180/228 |
| 7,178,621 | B2 | * | 2/2007  | de Groot ....................... 180/227 |

(Continued)

FOREIGN PATENT DOCUMENTS

EP   0 911 253 A2   4/1999
JP   2006-96117 A   4/2006

(Continued)

OTHER PUBLICATIONS

Official Communication issued in corresponding European Patent Application No. 14175360.8, mailed on Aug. 28, 2014.

*Primary Examiner* — Joseph Rocca
*Assistant Examiner* — Michael Stabley
(74) *Attorney, Agent, or Firm* — Keating & Bennett, LLP

(57) ABSTRACT

A saddle type vehicle includes a frame, an engine supported by the frame, a swing-arm swingably supported on the frame, a rear wheel supported on the swing-arm, a rear suspension arranged between the engine and the rear wheel, an air cleaner arranged in an intake passage, and an exhaust chamber arranged in an exhaust passage. At least a portion of the air cleaner is arranged above the rear suspension. At least a portion of the exhaust chamber is arranged below the rear suspension. The rear suspension extends in a direction intersecting with a vertical direction when viewed from a side of the saddle type vehicle. The rear suspension is coupled to the engine and the swing-arm. A height of the rear suspension in the vertical direction is smaller than a length of the rear suspension in a front-back direction.

17 Claims, 7 Drawing Sheets

(56) References Cited

U.S. PATENT DOCUMENTS

| | | | |
|---|---|---|---|
| 7,188,695 B2 * | 3/2007 | Miyakawa et al. | 180/219 |
| 7,419,028 B2 * | 9/2008 | Yamakura et al. | 180/291 |
| 7,434,645 B2 * | 10/2008 | Iizuka et al. | 180/227 |
| 7,490,688 B2 * | 2/2009 | Yamamoto | 180/228 |
| 7,527,119 B2 * | 5/2009 | Iizuka et al. | 180/227 |
| 7,621,363 B2 * | 11/2009 | Kinoshita et al. | 180/219 |
| 7,740,095 B2 * | 6/2010 | Matsushima | 180/227 |
| 8,141,672 B2 * | 3/2012 | Kuramochi et al. | 180/69.4 |
| 8,181,733 B2 * | 5/2012 | Locati et al. | 180/309 |
| 8,584,788 B2 * | 11/2013 | Ishibe | 180/309 |
| 8,695,747 B2 * | 4/2014 | Gogo et al. | 180/227 |
| 8,770,330 B2 * | 7/2014 | Inoue et al. | 180/68.4 |
| 2009/0166115 A1 | 7/2009 | Mizutani et al. | |
| 2010/0051369 A1 * | 3/2010 | Kuramochi et al. | 180/69.4 |
| 2012/0248734 A1 * | 10/2012 | Matsushima et al. | 280/281.1 |
| 2013/0015007 A1 * | 1/2013 | Inoue et al. | 180/68.4 |

FOREIGN PATENT DOCUMENTS

| | | |
|---|---|---|
| JP | 2009-241922 A | 10/2009 |
| JP | 2011-173533 A | 9/2011 |

* cited by examiner

SADDLE TYPE VEHICLE

BACKGROUND OF THE INVENTION

1. Field of the Invention

The present invention relates to saddle type vehicles.

2. Description of the Related Art

In the conventional model of a saddle type vehicle, a rear suspension is arranged vertically above an exhaust chamber with an air cleaner arranged above the rear suspension and behind a center frame (refer to Japan Laid-open Patent Application Publication No. 2009-241922). The conventional model described in Japan Laid-open Patent Application Publication No. 2009-241922 can prevent the heat of the engine and the exhaust chamber from propagating to the air cleaner.

In recent years, there has been the desire to increase the capacity of the air cleaner and the exhaust chamber to comply with increasingly strict emission and noise standards while maintaining the engine output.

However, if the size of the air cleaner in the saddle type vehicle described in Japan Laid-open Patent Application Publication No. 2009-241922 were to increase, the frame would limit expansion to the left and right, thus requiring that the air cleaner protrude upward and therefore the rider loses leg rest space. Additionally, if the size of the exhaust chamber in the saddle type vehicle described in Japan Laid-open Patent Application Publication No. 2009-241922 were to increase, the exhaust chamber would protrude downward or horizontally, thus reducing the minimum ground clearance and the bank angle of the vehicle. Accordingly, increasing the capacity of the air cleaner and the exhaust chamber in the saddle type vehicle described in Japan Laid-open Patent Application Publication No. 2009-241922 is no simple task.

SUMMARY OF THE INVENTION

With the above described situation in mind, preferred embodiments of the present invention provide a saddle type vehicle that provides increased capacity of the air cleaner and the exhaust chamber.

A saddle type vehicle according to a first aspect of a preferred embodiment of the present invention is provided with a frame, an engine, a swing-arm, a rear wheel, a rear suspension, an air cleaner, and an exhaust chamber. The engine is supported by the frame. The swing-arm is supported on the frame. The swing-arm is vertically swingable. The rear wheel is supported on the swing-arm. The rear suspension is arranged between the engine and the rear wheel. The air cleaner is arranged in an intake passage connected to the engine. The exhaust chamber is arranged in an exhaust passage connected to the engine. At least a portion of the air cleaner is arranged above the rear suspension. At least a portion of the exhaust chamber is arranged below the rear suspension. The rear suspension extends in a direction intersecting with a vertical direction when viewed from a side of the saddle type vehicle. The rear suspension is coupled to the engine and the swing-arm. A height of the rear suspension in the vertical direction is smaller than a length of the rear suspension in a front-back direction.

The saddle type vehicle according to a second aspect of a preferred embodiment of the present invention is provided with the features of the first aspect wherein the air cleaner, the rear suspension, and the exhaust chamber are arranged between the engine and the rear wheel.

The saddle type vehicle according to a third aspect of a preferred embodiment of the present invention is provided with features of the first aspect or the second aspect wherein at least a portion of the rear suspension is arranged above the swing-arm, and at least a portion of the exhaust chamber is arranged below the swing-arm.

The saddle type vehicle according to a fourth aspect of a preferred embodiment of the present invention includes the features of any one of the first through third aspects wherein the engine includes a cylinder block, a crankcase connected to a lower end portion of the cylinder block, and a transmission case connected to the rear end portion of the crankcase. Further, a front end portion of the rear suspension is supported on the transmission case.

The saddle type vehicle according to a fifth aspect of a preferred embodiment of the present invention includes the features of the fourth aspect wherein the engine includes a cylinder head connected to the upper end portion of the cylinder block. Further, the front end portion of the rear suspension is arranged above the transmission case.

The saddle type vehicle according to a sixth aspect of a preferred embodiment of the present invention is provided with features of the fourth aspect or the fifth aspect wherein an upper end of the rear suspension is positioned lower than an upper end of the cylinder block.

The saddle type vehicle according to a seventh aspect of a preferred embodiment of the present invention is provided with features of any one of the first through sixth aspects wherein a lower end of the rear suspension is positioned higher than an upper end of the swing-arm.

The saddle type vehicle according to an eighth aspect of a preferred embodiment of the present invention includes a crankshaft, a main shaft, and a drive shaft which respectively extend in the vehicle direction. The crankshaft is arranged inside the crankcase. The main shaft is coupled to the crankshaft via a clutch. The drive shaft is coupled to the main shaft via a transmission. Further, the lower end of the rear suspension is positioned higher than a lowest one of the crankshaft, the main shaft, and the drive shaft.

The saddle type vehicle according to a ninth aspect of a preferred embodiment of the present invention includes the features of any one of the first through eighth aspects wherein the air cleaner includes an exposed portion which is exposed from the frame when viewed from the side of the saddle type vehicle. Further, at least a portion of the exposed portion is wider than the frame in a vehicle width direction.

The saddle type vehicle according to a tenth aspect of a preferred embodiment of the present invention is provided with features of any one of the first through ninth aspects wherein at least a portion of the air cleaner is arranged above a front end portion of the rear suspension.

The saddle type vehicle according to an eleventh aspect of a preferred embodiment of the present invention is provided with features of any one of the first through tenth aspects wherein at least a portion of the air cleaner is arranged behind the engine.

The saddle type vehicle according to a twelfth aspect of a preferred embodiment of the present invention includes the features of any one of the first through eleventh aspects and is further provided with a fuel tank positioned higher than the air cleaner. At least a portion of the air cleaner is positioned rearward of the fuel tank.

The saddle type vehicle according to a thirteenth aspect of a preferred embodiment of the present invention includes the features of any one of the first through twelfth aspects and is further provided with a battery arranged behind the air cleaner, and a seat arranged above the battery. At least a portion of the air cleaner is positioned forward of the seat.

The saddle type vehicle according to a fourteenth aspect of a preferred embodiment of the present invention includes the features of any one of the fourth through thirteenth aspects wherein the transmission case includes a case body, and a bracket provided on the case body. The bracket supports the front end portion of the rear suspension.

The saddle type vehicle according to a fifteenth aspect of a preferred embodiment of the present invention includes the features of any one of the first through fourteenth aspects and is further provided with a link mechanism coupled to a rear end portion of the rear suspension and the swing-arm.

The saddle type vehicle according to a sixteenth aspect of a preferred embodiment of the present invention includes the features of any one of the first through fifteenth aspects wherein a front end of the rear suspension is coupled to the engine and does not overlap with the frame when viewed from the side of the saddle type vehicle.

In the saddle type vehicle according to the first aspect of a preferred embodiment of the present invention, the rear suspension is preferably coupled to the engine, and therefore, the rear suspension is arranged horizontally without being positionally restricted in relation to the frame. Therefore, it is possible to secure a large space above and below the rear suspension. Consequently, it is possible to increase the capacity of the air cleaner with at least a portion of the air cleaner arranged above the rear suspension, and to increase the capacity of the exhaust chamber with at least a portion of the exhaust chamber arranged below the rear suspension. As a result, it is possible to comply with emission and noise standards while maintaining high output of the engine. Additionally, it is possible to increase the design degree of freedom of the frame itself, since the rear suspension is not coupled to the frame.

In the saddle type vehicle according to the second aspect of a preferred embodiment of the present invention, the air cleaner, the rear suspension, and the exhaust chamber are preferably stacked vertically in order between the engine and the rear wheel, thus allowing for more efficient use of the space between the engine and the rear wheel. Consequently, the saddle type vehicle is made more compact.

In the saddle type vehicle according to the third aspect of a preferred embodiment of the present invention, the air cleaner, the rear suspension, the swing-arm, and the exhaust chamber are preferably stacked vertically in order, thus allowing for more efficient use of the space between the engine and the rear wheel.

In the saddle type vehicle according to the fourth aspect of a preferred embodiment of the present invention, the rear suspension is preferably supported closer to the swing-arm compared to a case where the rear suspension is supported by the cylinder block or the crankcase, and thus the rear suspension tends not to interfere with the unsupported section of the engine, or with other components. The gap provided behind the cylinder block in particular greatly increases flexibility when arranging the other components. Consequently, the flexibility in choosing the engine shape, and flexibility in arranging the other components increases.

In the saddle type vehicle according to the fifth aspect of a preferred embodiment of the present invention, the rear suspension is brought closer to the cylinder block compared to a case where the front end portion of the rear suspension is rearward of the transmission case. Therefore, the rear wheel is brought closer to the front wheel, thus shortening the wheelbase and centralizing the vehicle mass.

In the saddle type vehicle according to the sixth aspect of a preferred embodiment of the present invention, it is easier to reduce the height of the rear suspension, thus allowing for more efficient use of the space between the engine and the rear wheel.

In the saddle type vehicle according to the seventh aspect of a preferred embodiment of the present invention, it is easier to reduce the height of the rear suspension, thus allowing for more efficient use of the space between the engine and the rear wheel.

In the saddle type vehicle according to the eighth aspect of a preferred embodiment of the present invention, it is easier to reduce the height of the rear suspension, thus allowing for more efficient use of the space between the engine and the rear wheel.

In the saddle type vehicle according to the ninth aspect of a preferred embodiment of the present invention, at least a portion of an exposed portion is preferably wider than the frame in the vehicle width direction, thus allowing for an increase in the capacity of the air cleaner. Moreover, configuring the exposed portion above the rear suspension allows a further increase in the capacity of the air cleaner. Additionally, the rear suspension is coupled with the engine, increasing the design degree of freedom of the frame itself and thus making it easier to increase the size of the exposed portion.

In the saddle type vehicle according to the tenth aspect of a preferred embodiment of the present invention, the air cleaner is preferably close to the engine, thus making it easier to shorten the wheelbase.

In the saddle type vehicle according to the eleventh aspect of a preferred embodiment of the present invention, the height of the saddle type vehicle is easily reduced even while securing a larger capacity air cleaner.

In the saddle type vehicle according to the twelfth aspect of a preferred embodiment of the present invention, even if a portion of the air cleaner is arranged behind and below the fuel tank, the capacity of the fuel tank which is positioned above the air cleaner, will tend not to be limited if the capacity of the air cleaner is increased by arranging the rear suspension horizontally and expanding the air cleaner downward.

In the saddle type vehicle according to the thirteenth aspect of a preferred embodiment of the present invention, it is possible to avoid reducing the leg rest space for a rider seated in the seat even if the air cleaner is widened on the left and the right.

In the saddle type vehicle according to the fourteenth aspect of a preferred embodiment of the present invention, the front end portion of the rear suspension is preferably supported with a simple configuration, thus preventing an increase in the number of parts.

In the saddle type vehicle according to the fifteenth aspect of a preferred embodiment of the present invention, the attitude of the rear suspension is freely modified.

In the saddle type vehicle according to the sixteenth aspect of a preferred embodiment of the present invention, the front end portion of the rear suspension is preferably supported even if the front end of the rear suspension and the frame do not overlap when viewed from the side.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
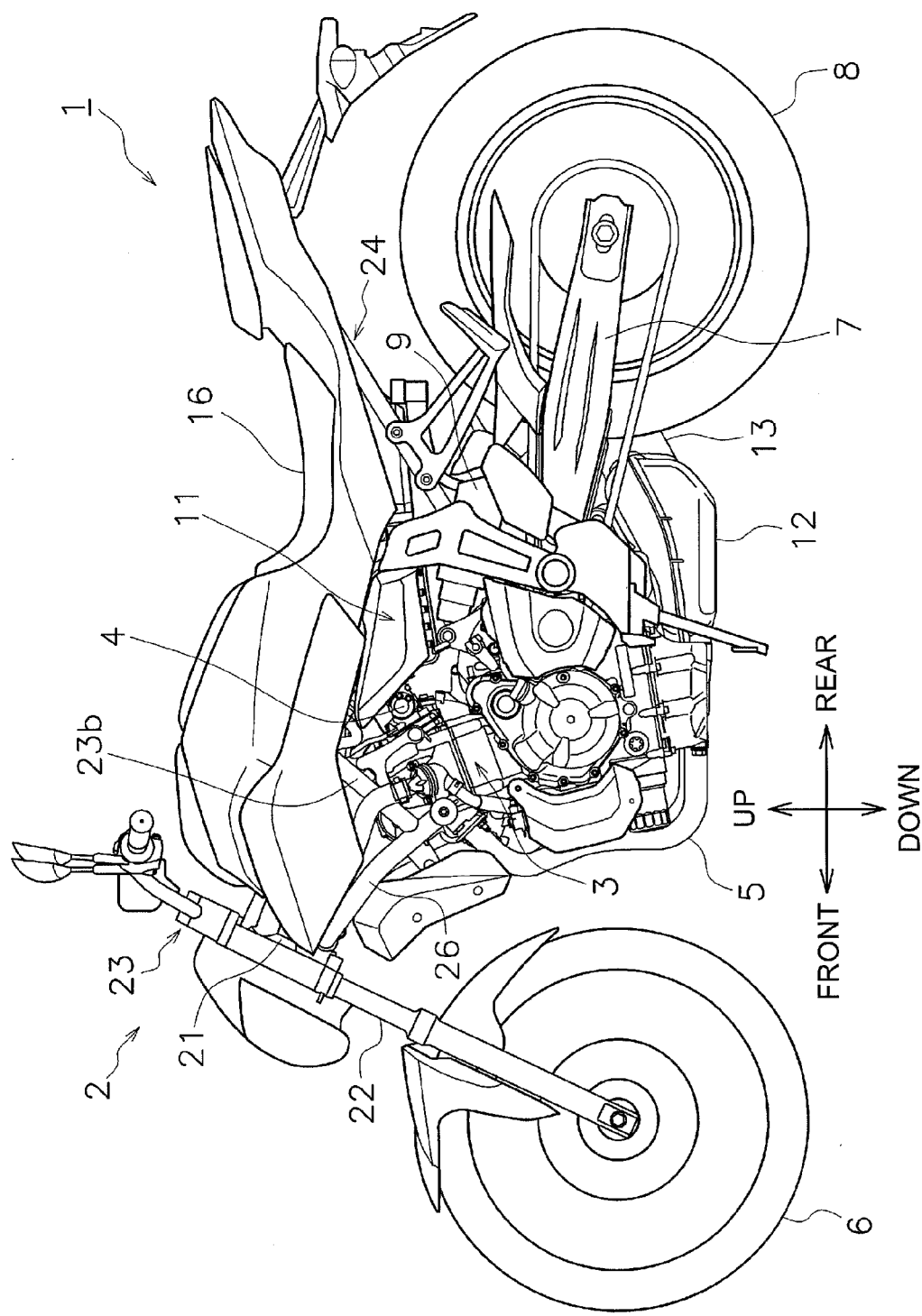
FIG. 1 is a side view of a saddle type vehicle.
Figure 2:
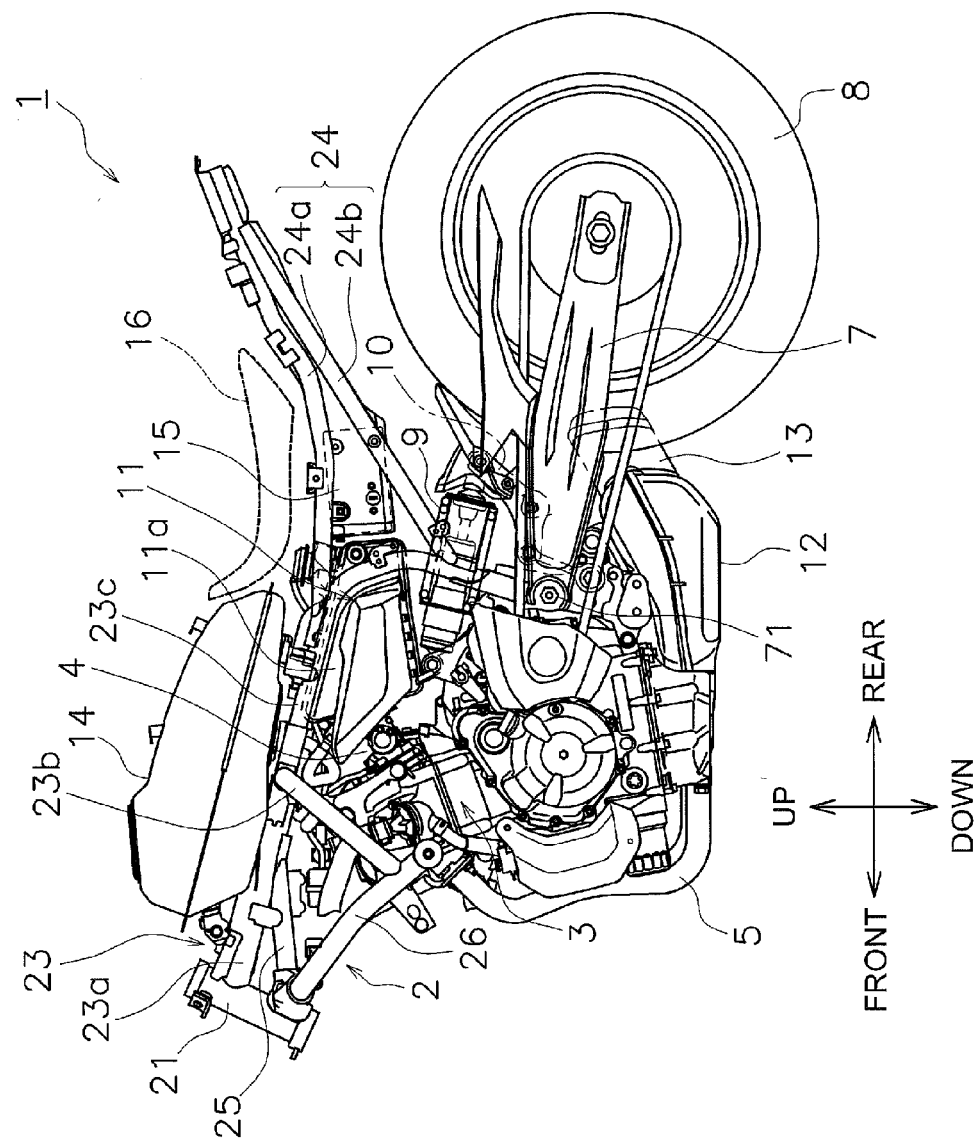
FIG. 2 is a partial side view of the saddle type vehicle.
Figure 3:
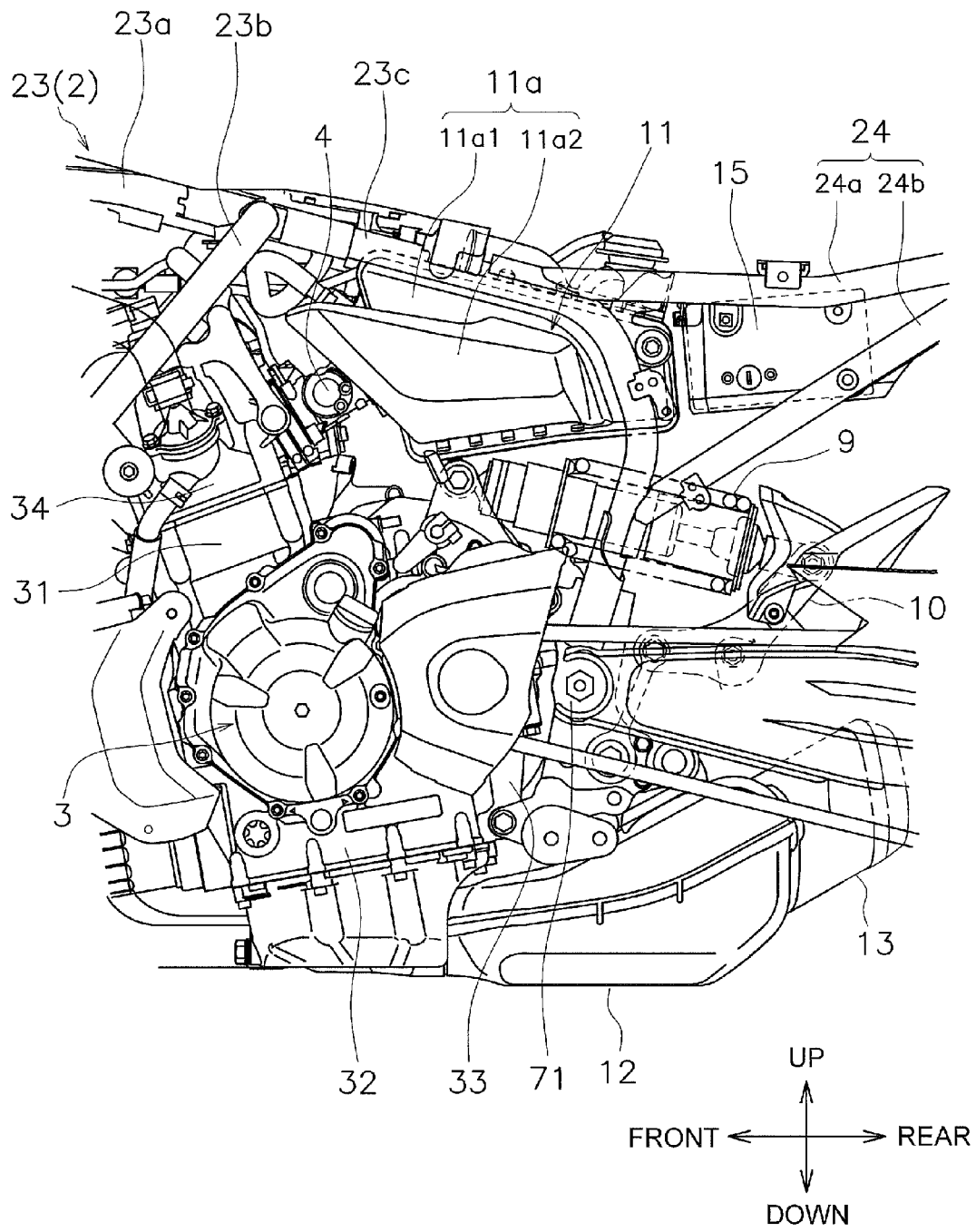
FIG. 3 is an exploded view of the main components in FIG. 2.
Figure 4:
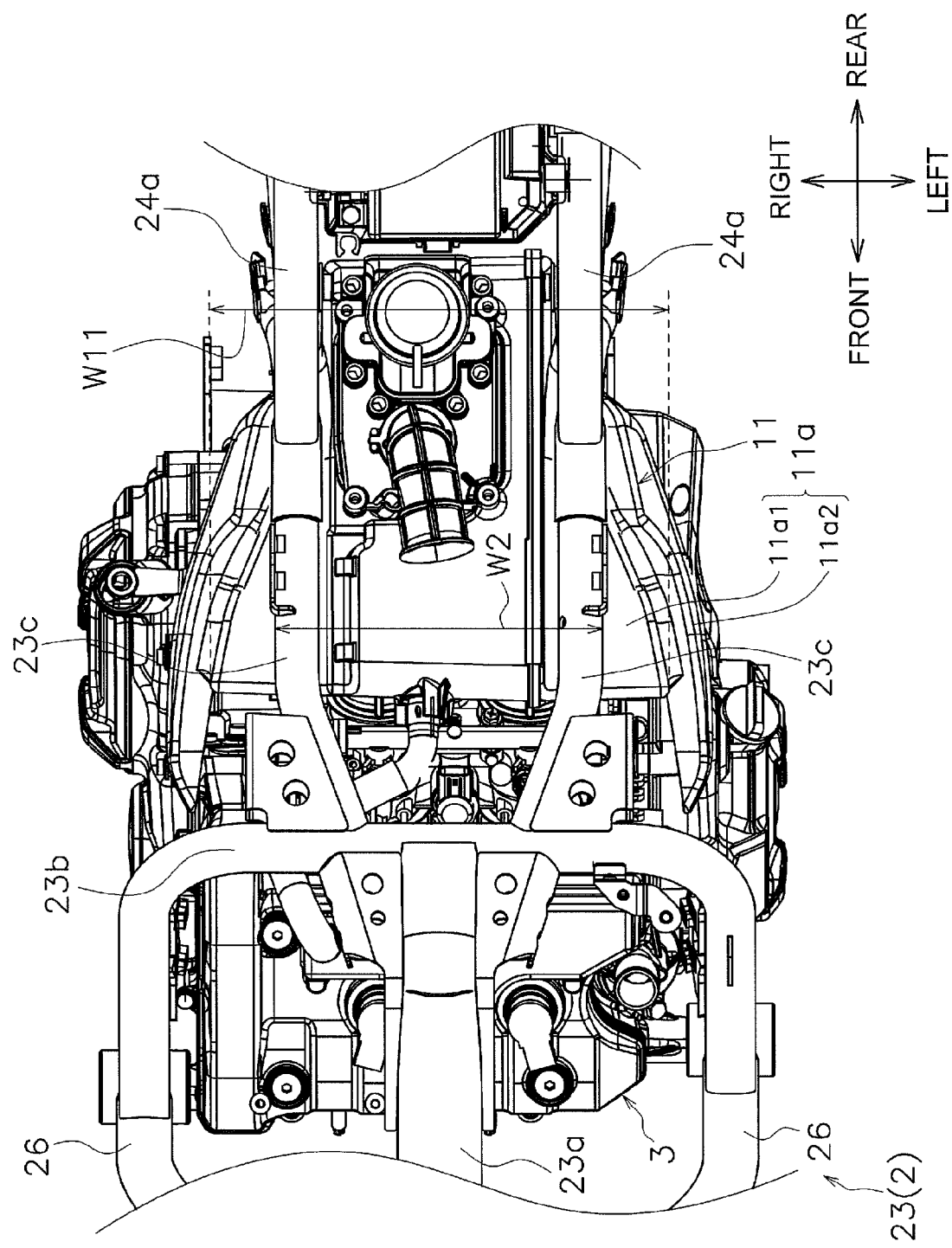
FIG. 4 is a partial top view of the saddle type vehicle.

An overall configuration of a saddle type vehicle 1 according to preferred embodiments of the present invention will be described with reference to the drawings. FIG. 1 is a side view of the saddle type vehicle. FIG. 2 is a partially transparent side view of the saddle type vehicle 1. FIG. 3 is an exploded view of the main components in FIG. 2. FIG. 4 is a top view of the saddle type vehicle 1. The fuel tank 14 and the seat 16 are omitted from FIG. 4.

The saddle type vehicle 1 is preferably a motorcycle, for example. As illustrated in FIG. 1 and FIG. 2, the saddle type vehicle 1 is provided with a frame 2, an engine 3, a throttle body 4, an exhaust pipe 5, a front fork 22, a front wheel 6, a swing-arm 7, a rear wheel 8, a rear suspension 9, a link mechanism 10, an air cleaner 11, an exhaust chamber 12, an exhaust port pipe 13, a fuel tank 14, a battery 15, and a seat 16.

In the description below, the front-back direction refers to the front-back direction of the vehicle from the perspective of a rider seated in the seat 16, and the vehicle width direction refers to the horizontal direction of the vehicle from the perspective of the rider seated in the seat 16.

The frame 2 includes a head pipe 21, a front frame 23, a rear frame 24, a tension pipe 25, and a down tube 26.

The head pipe 21 is arranged at the center of the vehicle in the vehicle width direction. The head pipe 21 extends vertically. The front fork 22 is rotatably supported by the head pipe 21. The front wheel 6 is rotatably supported at the lower end portion of the front fork 22.

As illustrated in FIG. 2 and FIG. 4, the front frame 23 is arranged behind the head pipe 21 and includes a main pipe 23a, a cross tube 23b, a pair of seat pillars 23c, 23c, a tension pipe 25, and a pair of down tubes 26.

The main pipe 23a is connected to the head pipe 21. The main pipe 23a extends rearward and downward from the head pipe 21 at the vehicle center in the vehicle width direction. The main head pipe 23a is arranged above the engine 3 (and more specifically, above the cylinder block 31 described below).

The cross tube 23b is U-shaped or substantially U-shaped with both ends coupled to the rear end portions of the pair of down tubes 26. The cross tube 23b extends upward and rearward from the pair of down tubes 26 and then curves and extends to the vehicle center in the vehicle width direction. In the present preferred embodiment, the cross tube 23b is coupled at the rear end portion of the main pipe 23a at the vehicle center in the vehicle width direction.

The pair of seat pillars 23c, 23c is connected to the cross tube 23b. The pair of seat pillars 23c, 23c respectively extend rearward from near the cross tube 23b near the vehicle center in the vehicle width direction and then make a large downward curve. The pair of seat pillars 23c, 23c is arranged to extend around the air cleaner 11 from above toward the rear and sandwich the rear end portion of the air cleaner 11. The pair of seat pillars 23c, 23c are arranged side-by-side in the vehicle width direction. The pair of seat pillars 23c, 23c includes attachment plates 230 at the lower end portions to set up the suspension of the engine 3, and a pivot shaft 71.

The tension pipe 25 is connected to the head pipe 21 and the main pipe 23a. The tension pipe 25 extends rearward and upward from the head pipe 21 underneath the main pipe 23a and connects to the lower portion of the main pipe 23a.

The pair of down tubes 26, 26 is connected to the head pipe 21. The pair of down tubes 26, 26 respectively extend rearward and downward from the head pipe 21 and extend away from each other. The rear end portions of the pair of down tubes 26, 26 respectively connect to the front portion of the engine 3.

The rear frame 24 is connected to the pair of seat pillars 23c, 23c on the front frame 23. The rear frame 24 includes a pair of seat pipes 24a, 24a, and a pair of backstays 24b, 24b.

The pair of seat pipes 24a, 24a are arranged side-by-side in the vehicle width direction. The pair of seat pipes 24a, 24a respectively extend rearward and upward from near the curved portion of the pair of seat pillars 23c, 23c.

The pair of backstays 24b, 24b are arranged side-by-side in the vehicle width direction. The pair of backstays 24b, 24b respectively extend rearward and upward from below the curved portion of the pair of seat pillars 23c, 23c. The pair of backstays 24b, 24b respectively connect to the rear portion of the seat pipes 24a, 24a.

The engine 3 is arranged behind the front wheel 6. The engine 3 is arranged below the fuel tank 14. The engine 3 is supported by the frame 2. More specifically, the engine 3 is suspended from the pair of down tubes 26, 26, and the attachment plate 230. The throttle body 4 is connected to the engine 3. The throttle body 4 supplies the engine 3 with air vented from the air cleaner 11 by opening and closing a throttle valve. The exhaust pipe 5 is connected to the engine 3.

The swing-arm 7 extends rearward from the frame 2 (more specifically, from the attachment plate 230). The frame 2 (the attachment plate 230) supports the swing-arm 7 by way of the pivot shaft 71, allowing the swing-arm 7 to swing vertically. The rear wheel 8 is rotatably supported at the rear end portion of the swing-arm 7.

The rear suspension 9 is arranged at the center of the vehicle in the vehicle width direction. The rear suspension 9 is arranged between the engine 3 and the rear wheel 8. That is, the rear suspension 9 lies between the engine (more specifically the cylinder block 31 described below and the transmission case 33) and the rear wheel 8. The rear section of the rear suspension 9 is arranged above the swing-arm 7. The rear suspension 9 is arranged within the space defined by the engine 3 and the rear wheel 8 in the upper section of the space sectioned off by the swing-arm 7.

The rear suspension 9 is arranged tilted forward, where the upper end portion of the rear suspension 9 is positioned farther forward than the lower end portion. Accordingly, the rear suspension 9 extends in a direction intersecting with the vertical direction when the vehicle is viewed from the side. The front end portion of the rear suspension 9 is coupled to the engine 3. The rear end portion of the rear suspension 9 is coupled to the swing-arm 7 via a link mechanism 10. The coupling mechanism for the rear suspension 9 will be described below.

The air cleaner 11 vents purified air to the throttle body 4. The air cleaner 11 along with the throttle body 4 define the intake passage. The air cleaner 11 faces the engine 3 with the throttle body 4 therebetween. The air cleaner 11 faces the engine (the transmission case, described below) with the front end portion of the rear suspension 9 therebetween.

As illustrated in FIG. 2 and FIG. 3, a gap is provided between the air cleaner 11 and the rear suspension 9. The gap is determined considering the extent of the vertical swing of the rear suspension 9.

The air cleaner 11 is arranged between the engine 3 and the rear wheel 8. That is, the air cleaner 11 lies between the engine (more specifically, the cylinder block 31 described below and the cylinder head) and the rear wheel 8. The air cleaner 11 is arranged higher than the exhaust chamber 12. The air cleaner 11 is arranged higher than the swing-arm 7. The rear section of the air cleaner 11 is arranged above the front end portion of the rear suspension 9. The air cleaner 11 is arranged within the space defined by the engine 3 and the rear wheel 8 in the upper portion of the space sectioned off by the swing-arm 7.

The air cleaner 11 is arranged below the front end portion of the pair of seat pillars 23*c*, 23*c*.

As illustrated in FIG. 2 and FIG. 3, the air cleaner 11 includes an exposed portion 11*a* which is exposed from the frame 2 when viewed from the side. The exposed portion 11*a* includes an intake box 11*a*1 the inside of which serves as a portion of the intake passage, and a cover 11*a*2 which covers the side surface of the intake box 11*a*1. As illustrated in FIG. 4, the intake box 11*a*1 is wider than the frame 2 in the vehicle width direction. Therefore, the maximum width W11 of the air cleaner 11 is larger than the maximum width W2 of the pair of seat pillars 23*c*, 23*c*. Here, "exposed" means exposed in relation to the frame 2 and the air cleaner 11; for example, this includes the case where the air cleaner 11 is covered with some other component such as a cowl.

The lower section of the air cleaner 11 is arranged behind the engine 3. The upper section of the air cleaner 11 is arranged higher than the upper end of the engine 3. The air cleaner 11 is arranged lower than the fuel tank 14. The rear end section of the air cleaner 11 is positioned farther rearward than the fuel tank 14. The air cleaner 11 is arranged lower than the seat 16. The front end section of the air cleaner 11 is positioned farther forward than the seat 16.

The exhaust chamber 12 is coupled at the downstream of the exhaust pipe 5. The exhaust chamber 12 includes a built in expansion chamber configured to expand the exhaust from the engine 3. The exhaust chamber 12 along with the exhaust pipe 5 and the exhaust port pipe 13 define the exhaust passage.

The exhaust chamber 12 is arranged between the engine 3 and the rear wheel 8. That is, the exhaust chamber 12 is sandwiched between the lower portion of the engine 3, and the wheel 8. The exhaust chamber 12 is arranged below the rear suspension 9. The exhaust chamber 12 is arranged below the swing-arm 7. The lower section of the exhaust chamber 12 is arranged lower than the engine 3. The exhaust port pipe 13 is coupled downstream of the exhaust chamber 12. The rear end of the exhaust chamber 12 is positioned farther forward than the rear end of the exhaust port pipe 13. The upper end of the exhaust chamber 12 is positioned lower than the upper end of the exhaust port pipe 13. The exhaust chamber 12 is arranged within the space defined by the engine 3 and the rear wheel 8 in the lower portion of the space sectioned off by the swing-arm 7. In the side views illustrated in FIG. 2 and FIG. 3, the rear portion of the exhaust chamber 12 is shaped to project upward.

The fuel tank 14 is supported on the frame 2 (that is, on the rear portion of the main pipe 23*a*, and the front portion of the pair of seat pillars 23*c*, 23*c*). The fuel tank 14 is arranged in front of the seat 16. The fuel tank 14 is arranged higher than the air cleaner 11.

The battery 15 is arranged behind the air cleaner 11. The battery 15 is arranged below the seat 16. The front end portion of the seat 16 is positioned above the rear end section of the air cleaner 11.

Figure 5:
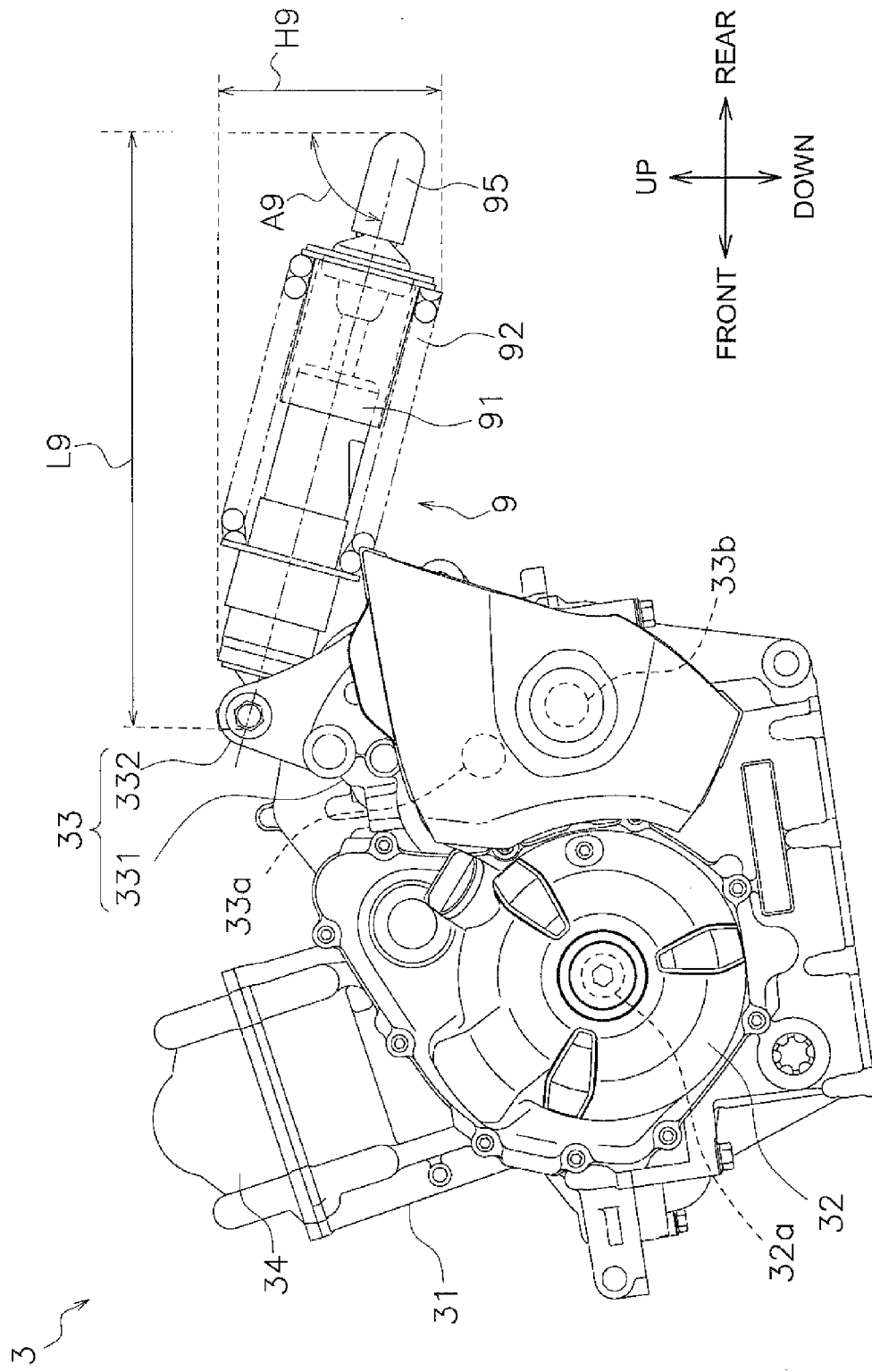
FIG. 5 is a side view for explaining the coupling mechanism between the engine and the rear suspension.
Figure 6:
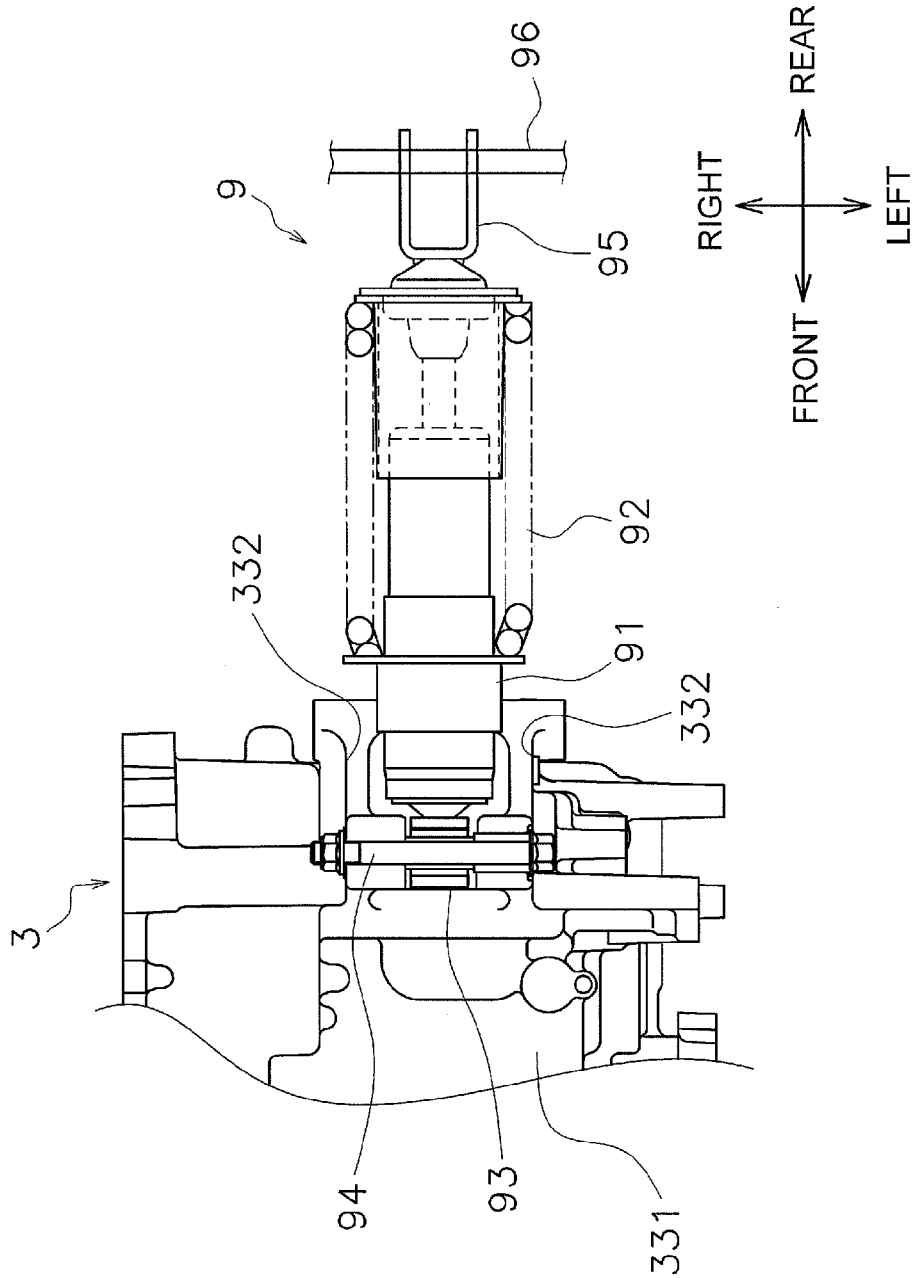
FIG. 6 is a top view for explaining the coupling mechanism between the engine and the rear suspension.
Figure 7:
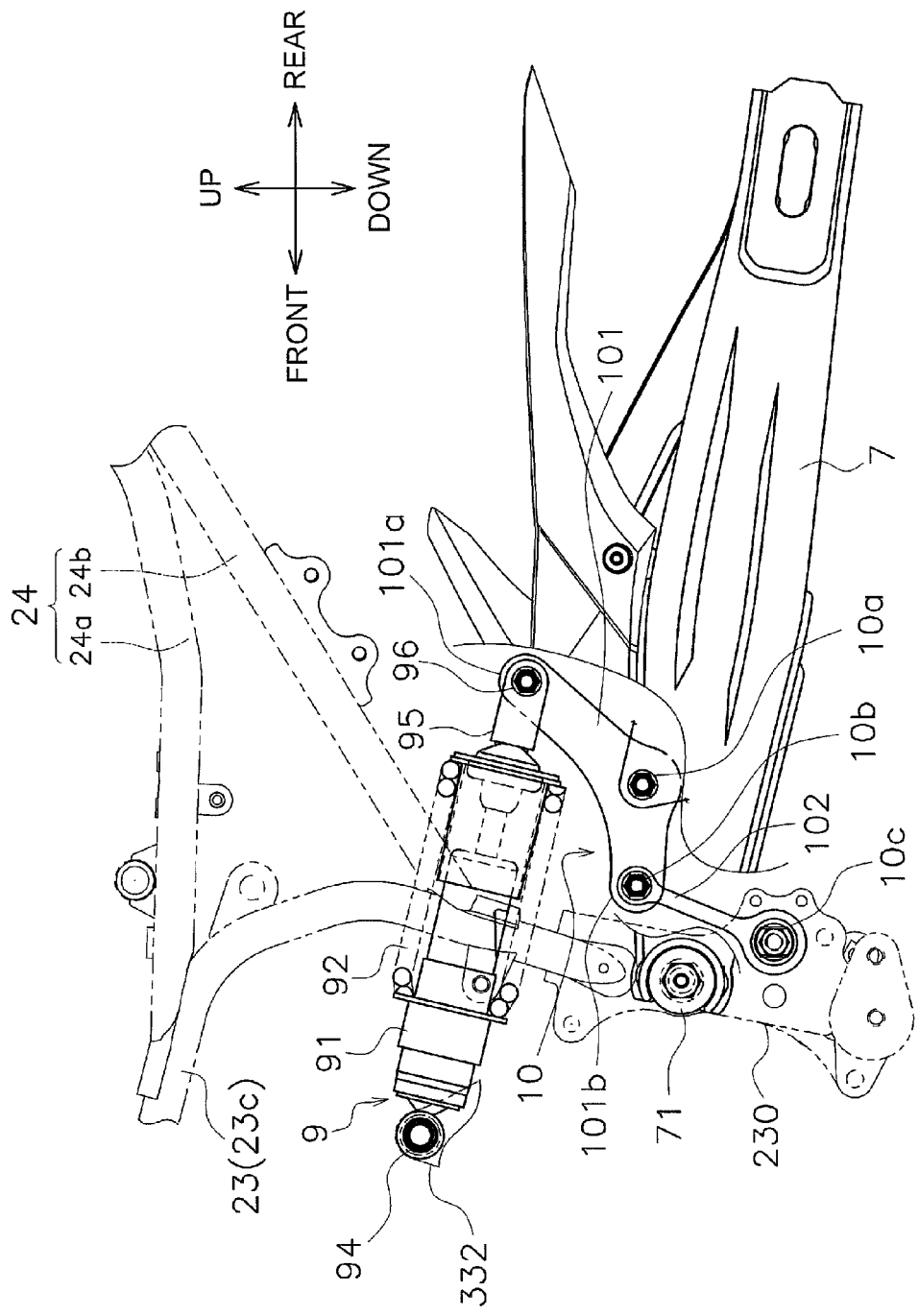
FIG. 7 is a side view for explaining the coupling mechanism between the swing-arm and the rear suspension.

Next, a coupling mechanism for the rear suspension 9 will be described with reference to the drawings. FIG. 5 is a side view for explaining the coupling mechanism between the engine 3 and the rear suspension 9. FIG. 6 is a top view for explaining the coupling mechanism between the engine 3 and the rear suspension 9. FIG. 7 is a side view for explaining the coupling mechanism between the swing-arm 7 and the rear suspension 9.

As illustrated in FIG. 5, the engine 3 includes a cylinder block 31, a crankcase 32, a transmission case 33, and a cylinder head 34. The cylinder block 31 includes a built-in cylinder that defines a combustion chamber. The crankcase 32 extends from the lower end portion of the cylinder block 31. A crankshaft 32*a* is arranged inside the crankcase 32. The crankshaft 32*a* extends in the vehicle width direction. The transmission case 33 extends from the rear end portion of the crankcase 32. A main shaft 33*a* and a drive shaft 33*b* are arranged inside the transmission case 33. The main shaft 33*a* and the drive shaft 33*b* respectively extend in the vehicle width direction. The main shaft 33*a* is coupled to the crankshaft 32 via a clutch (not shown). The drive shaft 33*b* is coupled to the main shaft 33*a* via a transmission (not shown). The cylinder head 34 extends from the upper end portion of the cylinder block 31.

In the present preferred embodiment, the crankshaft 32*a* is at the lowest position, and the main shaft 33*a* is at the highest position of the three shafts: the crankshaft 32*a*, the main shaft 33*a*, and the drive shaft 33*b*.

The transmission case 33 includes a case body 331, and a pair of brackets 332. The case body 331 accommodates not only the main shaft 33*a* and the drive shaft 33*b*, but also the clutch and the transmission. The pair of brackets 332 is arranged on the top surface of the case body 331. The pair of brackets 332 supports the front end portion of the rear suspension 9. The pair of brackets 332 is arranged facing each other at a prescribed distance from each other in the vehicle width direction. The pair of brackets 332 is preferably integral with the case body 331.

The rear suspension 9 is arranged with a forward tilt. The height H9 of the rear suspension 9 in the vertical direction is smaller than the length L9 of the rear suspension in the front-back direction. In other words, the angle A9 (namely, the tilt angle) that the rear suspension 9 makes with the vertical direction is preferably greater than about 45°, for example.

As illustrated in FIG. 5, the front end portion of the rear suspension 9 is positioned above the transmission case 33, and the rear end portion of the rear suspension 9 is arranged behind the transmission case 33. The upper end of the rear suspension 9 is positioned lower than the upper end of the cylinder head 34. In the present preferred embodiment, the lower end of the rear suspension 9 is positioned higher than the main shaft 33*a* which is the highest positioned of the three shafts.

As illustrated in FIG. 5 and FIG. 6, the rear suspension 9 includes a damper 91, a coil spring 92, a front attachment portion (front end) 93, a front pivot shaft 94, a rear attachment portion 95, and a rear pivot shaft 96. The damper 91 reduces the stress on the rear wheel 8 by performing a reciprocating movement. The forward tilt angle A9 of the damper 91 fluctuates in response to the reciprocating movement during travel. The coil spring 92 is wound around the damper 91.

The front attachment portion 93 is attached to the front end of the damper 91. The front pivot shaft 94 supports the front attachment portion 93, allowing the front attachment portion 93 to swing vertically. The front pivot shaft 94 extends in the vehicle width direction. The pair of brackets 332 of the transmission case 33 supports both end portions of the front pivot shaft 94. The rear attachment portion 95 is attached to the rear end of the damper 91. The rear pivot shaft 96 supports the rear attachment portion 95, allowing the rear attachment portion 95 to swing vertically. The rear pivot shaft 96 extends in the vehicle width direction. Both end portions of the rear pivot shaft 96 are supported by the link mechanism 10.

The link mechanism 10 is arranged at the vehicle center in the vehicle width direction. As illustrated in FIG. 7, the link mechanism includes an L-shaped bracket 101 and an arm 102.

The L-shaped bracket 101 is supported by the central pivot shaft 10a to swing forward and backward. The central pivot shaft 10a extends in the vehicle width direction. The central pivot shaft 10a is supported at the front end portion of the swing-arm 7. The rear pivot shaft 96 of the rear suspension 9 is inserted into a first end portion 101a of the L-shaped bracket 101. A first coupling shaft 10b is inserted into the second end portion 101b of the L-shaped bracket 101. The upper end portion of the arm 102 is pivotally supported at the first coupling shaft 10b. The lower end portion of the arm 102 is pivotally supported at the second coupling shaft 10c. The second coupling shaft 10c is supported on the attachment plate 230 which is on the lower end portion of the pair of seat pillars 23c, 23c in the frame 2.

The saddle type vehicle according to the present preferred embodiment is provided with a frame 2, a rear suspension 9, an air cleaner 11, and an exhaust chamber 12. The rear section of the air cleaner 11 is arranged above the rear suspension 9. The exhaust chamber 12 is arranged below the rear suspension 9. The rear suspension 9 is coupled to the engine 3 and the swing-arm 7. The height H9 of the rear suspension 9 in the vertical direction is smaller than the length L9 of the rear suspension in the front-back direction.

In this manner, the rear suspension 9 is coupled to the engine 3, and therefore the rear suspension 9 is arranged horizontally without being positionally restricted relative to the frame 2. Consequently, it is possible to secure a large space above and below the rear suspension 9. Therefore, it is possible to increase the capacity of the air cleaner 11 with at least a portion of the air cleaner 11 arranged above the rear suspension 9, and to increase the capacity of the exhaust chamber 12 with at least a portion of the exhaust chamber 12 arranged below the rear suspension 9. As a result, it is possible to comply with emission and noise standards while maintaining high output of the engine 3.

Additionally, the rear suspension 9 is not coupled to the frame 2, thus increasing flexibility when designing the frame itself. Namely, the front attachment portion 93 of the rear suspension 9 is coupled to the engine 3, and thus there is no need for the front attachment portion 93 to be coupled to the frame 2 (or a cross member that spans the frame 2 in the vehicle width direction). Therefore, even if the rear suspension 9 is arranged horizontally between the engine 3 and the rear wheel 8, it is possible to use a configuration where there is no frame 2 near the front attachment portion 93 of the rear suspension 9 when the vehicle is viewed from the side.

The rear suspension 9, the air cleaner 11, and the exhaust chamber 12 are arranged between the engine 3 and the rear wheel 8.

In this manner, the air cleaner 11, the rear suspension 9, and the exhaust chamber 12 are preferably stacked vertically in order between the engine 3 and the rear wheel 8, thus allowing for more efficient use of the space between the engine 3 and the rear wheel 8. That is, the air cleaner 11, the rear suspension 9, and the exhaust chamber 12 are put together and arranged in the space between the engine 3 and the rear wheel 8. Consequently, the saddle type vehicle 1 is made more compact.

The rear section of the rear suspension 9 is arranged above the swing-arm 7. The exhaust chamber 12 is arranged below the swing-arm 7.

In this manner, the air cleaner 11, the rear suspension 9, and the swing-arm 7 are preferably stacked vertically in order, thus allowing for more efficient use of the space between the engine 3 and the rear wheel 8. Namely, the swing-arm 7 divides the space between the engine 3 and the rear wheel 8, where the air cleaner 11 and the rear suspension 9 are arranged in the upper portion of the space, and the exhaust chamber 12 is arranged in the lower portion of the space to secure a range of movement for the swing-arm 7 and the rear suspension 9 while allowing an increase in the capacity of the air cleaner 11 and the exhaust chamber 12.

The front end portion of the rear suspension 9 is supported on the transmission case 33.

Accordingly, the rear suspension 9 is supported closer to the swing-arm 7 compared to a case where the rear suspension 9 is supported by the cylinder block 31 or the crankcase 32, and thus the rear suspension 9 tends not to interfere with the unsupported section of the engine 3, nor with other components. The gap provided behind the cylinder block 31 particularly facilitates increasing the capacity of the air cleaner 11, and it is possible to arrange a canister (not shown) or the like. Consequently, the flexibility of the shape of engine 3 increases, and flexibility in arranging the other components increases.

Additionally, the rear end section of the air cleaner 11 which is positioned above the front end portion of the rear suspension 9 is positioned above the transmission case 33 with the rear suspension 9 interposed therebetween, and therefore the rear suspension 9 blocks radiant heat from the transmission case 33, thus curbing a rise in temperature of the air cleaner 11. It is therefore possible to control increases in the intake temperature.

The front end portion of the rear suspension 9 is positioned above the transmission case 33.

Accordingly the rear suspension 9 is brought closer to the cylinder block 31 compared to a case where the front end portion of the rear suspension 9 is arranged behind the transmission case 33. Therefore, the rear wheel 8 is brought closer to the front wheel 6, thus shortening the wheelbase and centralizing the vehicle mass.

The upper end of the rear suspension 9 is positioned lower than the upper end of the cylinder block 31.

Therefore, it is easier to reduce the height H9 of the rear suspension 9, thus allowing for more efficient use of the space between the engine 3 and the rear wheel 8. In other words, it is possible to reduce the proportion of space occupied by the rear suspension 9 in the upper portion between the engine 3 and the rear wheel 8. Accordingly, it is easier to secure a large space above the rear suspension 9, thus making it possible to expand the capacity of the air cleaner 11 downward.

The lower end of the rear suspension 9 is positioned higher than the upper end of the swing-arm 7.

Therefore, it is easier to reduce the height H9 of the rear suspension 9, thus allowing for more efficient use of the space between the engine 3 and the rear wheel 8. In other words, it is possible to reduce the proportion of space occupied by the rear suspension 9 in the lower portion between the engine 3 and the rear wheel 8. Accordingly, it is easier to secure a large space below the rear suspension 9, to allow the swing-arm 7 to be arranged comparatively higher, or to allow for a larger capacity air cleaner 11.

The lower end of the rear suspension 9 is positioned higher than the drive shaft 33b, which is the highest positioned of the crankshaft 32a, the main shaft 33a, and the drive shaft 33b.

Therefore, it is easier to reduce the height H9 of the rear suspension 9, thus allowing for more efficient use of the space between the engine 3 and the rear wheel 8. In other words, it is possible to reduce the proportion of space occupied by the rear suspension 9 in the lower portion between the engine 3 and the rear wheel 8. Accordingly, it is easier to secure a large space below the rear suspension 9, to allow the swing-arm 7 to be arranged comparatively higher, or to allow for a larger capacity air cleaner 11.

The air cleaner 11 is provided with an exposed portion 11*a* that is exposed from the frame 2 when viewed from the side. The intake box 11*a*1 of the exposed portion 11*a* is wider than the frame 2 in the vehicle width direction.

Accordingly, the intake box 11*a*1 of the exposed portion 11*a* is wider than the frame 2 in the vehicle width direction, and thus the capacity of the air cleaner 11 is increased in the vehicle width direction. Moreover, given that the capacity of the air cleaner 11 has also been expanded vertically, placing the intake box 11*a*1 of the exposed portion 11*a* in the upper portion above the rear suspension 9 allows the capacity of the air cleaner 11 to be further expanded.

Additionally, the rear suspension 9 is coupled to the engine 3, increasing the design flexibility of the frame 2 and thus making it easier to increase the size of the side surface of the intake box 11*a*1 of the exposed portion 11*a*. That is, when the rear section of the air cleaner 11 is positioned above the rear suspension 9, if the rear suspension 9 is coupled to the frame 2, the frame 2 will overlap with the center or a large section of the side surface of the air cleaner 11 because the portion of the frame 2 to which the rear suspension 9 is attached tends to make it difficult to expand the intake box 11*a*1 of the exposed portion 11*a* in the vehicle width direction. In the present preferred embodiment however, the rear suspension 9 is coupled to the engine, thus increasing the design flexibility of the frame 2, and therefore it is possible to secure an exposed portion 11*a* with a large side surface by using a structure where the frame 2 curves at the rear end section of the air cleaner 11. Furthermore, a large projecting cover 11*a*2 may be used to cover the side surface of the intake box 11*a*1, thus improving the design.

The rear section of the air cleaner 11 is positioned above the front end portion of the rear suspension 9.

Therefore, the air cleaner 11 is brought closer to the engine, thus facilitating shortening the wheelbase of the vehicle.

The lower section of the air cleaner 11 is arranged behind the engine 3.

Therefore, the saddle type vehicle 1 is made shorter compared to a case where the air cleaner 11 is positioned farther above the engine 3. In other words, the height of the saddle type vehicle 1 is controlled even with a larger capacity air cleaner 11 by arranging the air cleaner 11 behind the cylinder block 31.

The fuel tank 14 is arranged higher than the air cleaner 11. The rear end section of the air cleaner 11 is positioned farther rearward than the fuel tank 14.

In this manner, the air cleaner 11 is arranged behind and below the fuel tank 14, and therefore the capacity of the air cleaner is increased without being limited by the fuel tank 14. Moreover, the capacity of the fuel tank 14 which is positioned above the air cleaner 11, is not limited even if the air cleaner 11 is arranged behind and below the fuel tank 14 and the capacity of the air cleaner 11 is increased, so long as the rear suspension 9 is arranged horizontally and the air cleaner 11 is expanded downward.

The front end section of the air cleaner 11 is positioned farther forward than the seat 16.

Therefore, it is possible to avoid reducing the leg rest space for a rider seated in the seat 16 even if the air cleaner 11 is widened on the left and the right.

The transmission case 33 includes a case body 331, and a pair of brackets 332 that support the front end portion of the rear suspension 9.

Therefore, the front end portion of the rear suspension 9 is supported with a simple configuration, thus preventing an increase in the number of parts.

Further provided is a link mechanism 10 coupled to the rear end portion of the rear suspension 9 and the swing-arm 7.

Accordingly the attitude of the rear suspension 9 is freely variable.

The front end of the rear suspension 9, which is coupled to the engine 3, does not overlap with the frame 2 when viewed from the side.

Accordingly, even when the front end of the rear suspension 9 and the frame 2 do not overlap when viewed from the side, the front end portion of the rear suspension 9 is supported without installing a bracket and the like on the frame 2.

Other Preferred Embodiments

While the present invention has been described by way of the above-mentioned preferred embodiments, the statements and drawings which are a portion of this disclosure should not be taken as limitations on the present invention. Various substitute preferred embodiments, working examples, and practical features should be clear to persons skilled in the art from this description.

In the above-mentioned preferred embodiments, the rear section of the rear suspension 9 is preferably arranged above the swing-arm 7, however, the entire rear suspension 9 may be arranged above the swing-arm 7.

In the above-mentioned preferred embodiments, the rear section of the air cleaner 11 is preferably arranged above the rear suspension 9, however, the entire air cleaner 11 may be arranged above the rear suspension 9.

In the above-mentioned preferred embodiments, the air cleaner 11 is preferably arranged above the front end portion of the rear suspension 9, however, the air cleaner 11 may be arranged above the entire rear suspension 9.

In the above-mentioned preferred embodiments, the upper section of the air cleaner 11 is preferably arranged higher than the upper end of the engine 3, however, the entire air cleaner 11 may be arranged lower than the upper end of the engine 3.

In the above-mentioned preferred embodiments, the rear end section of the air cleaner 11 is preferably positioned farther behind the fuel tank 14, however, the entire air cleaner 11 may be positioned farther behind the fuel tank 14.

In the above-mentioned preferred embodiments, the front section of the air cleaner 11 is positioned farther forward than the seat 16, however, the entire air cleaner 11 may be positioned farther forward than the seat 16.

In the above-mentioned preferred embodiments, a portion of the exhaust chamber 12 is arranged below the rear suspension 9, however, the whole exhaust chamber 12 may be arranged below the rear suspension 9. Additionally, a silencer may be provided beside the rear wheel and connected to the exhaust chamber 12.

In the above-mentioned preferred embodiments, the rear suspension 9 is preferably arranged horizontally with a forward tilt, however, the rear suspension 9 may be arranged horizontally with a backward tilt. That is, the upper end portion of the rear suspension 9 may be arranged behind the lower end portion.

In the above-mentioned preferred embodiments, the upper end of the rear suspension 9 is preferably positioned lower than the upper end of the cylinder block 31, however, the upper end of the rear suspension may be positioned higher than the upper end of the cylinder block 31.

In the above-mentioned preferred embodiments, the lower end of the rear suspension 9 is preferably positioned lower than the lower end of the cylinder block 31, however, the lower end of the cylinder block 31 may be positioned lower than the lower end of the rear suspension 9.

In the above-mentioned preferred embodiments, the lower end of the rear suspension 9 is preferably positioned higher than any one of the crankshaft 32*a*, the main shaft 33*a*, and the drive shaft 33*b*, however, the positional relationship between the rear suspension 9 and the crankshaft 32*a*, the main shaft 33*a*, and the drive shaft 33*b* may be freely set.

In the above-mentioned preferred embodiments, the pair of brackets 332 which supports the front end portion of the rear suspension 9 is preferably provided on the transmission case 33, however there is no need to be limited to this configuration. For example, the pair of brackets 332 may be provided on the outer surface of the engine 3.

In the above-mentioned preferred embodiments, the pair of brackets 332 is preferably integral with the case body 331, however, the pair of brackets 332 may be separate from the case body 331.

In the above-mentioned preferred embodiments, the rear suspension 9 is preferably coupled to the swing-arm 7 by way of the link mechanism 10, however, the rear suspension 9 may be coupled directly to the swing-arm 7 without the link mechanism 10 therebetween.

In this manner, it is obvious that the present invention may include various preferred embodiments and so forth that are not described here. Accordingly, the technical scope of the present invention is defined by the features of the present invention as set forth in the scope of the claims which are supported by the above description.

The preferred embodiments of the present invention disclosed herein allows an increase in the capacity of the air cleaner and the exhaust chamber and is thus useful in the field of saddle type vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle type vehicle comprising:
   a frame;
   an engine supported by the frame;
   a swing-arm supported on the frame and configured to be vertically swingable;
   a rear wheel supported on the swing-arm;
   a rear suspension arranged between the engine and the rear wheel;
   an air cleaner arranged in an intake passage connected to the engine; and
   an exhaust chamber arranged in an exhaust passage connected to the engine; wherein
   at least a portion of the air cleaner is arranged above the rear suspension;
   at least a portion of the exhaust chamber is arranged below the rear suspension and overlaps the rear suspension in plan view;
   the rear suspension extends in a direction intersecting with a vertical direction when viewed from a side of the saddle type vehicle, and the rear suspension is coupled to the engine and the swing-arm; and
   a height of the rear suspension in the vertical direction is smaller than a length of the rear suspension in a front-back direction of the saddle type vehicle.

2. The saddle type vehicle according to claim 1, wherein the air cleaner, the rear suspension, and the exhaust chamber are arranged between the engine and the rear wheel.

3. The saddle type vehicle according to claim 1, wherein at least a portion of the rear suspension is arranged above the swing-arm, and at least a portion of the exhaust chamber is arranged below the swing-arm.

4. The saddle type vehicle according to claim 1, wherein the engine includes a cylinder block, a crankcase connected to a lower end portion of the cylinder block, and a transmission case connected to a rear end portion of the crankcase; and
   a front end portion of the rear suspension is supported on the transmission case.

5. The saddle type vehicle according to claim 4, wherein the engine includes a cylinder head connected to an upper end portion of the cylinder block, and the front end portion of the rear suspension is arranged above the transmission case.

6. The saddle type vehicle according to claim 4, wherein an upper end of the rear suspension is positioned lower than an upper end of the cylinder block.

7. The saddle type vehicle according to claim 1, wherein a lower end of the rear suspension is positioned higher than an upper end of the swing-arm.

8. The saddle type vehicle according to claim 7, wherein the engine includes a crankshaft, a main shaft, and a drive shaft which respectively extend in a vehicle width direction;
   the crankshaft is arranged inside the crankcase, the main shaft is coupled to the crankshaft via a clutch, and the drive shaft is coupled to the main shaft via a transmission; and
   the lower end of the rear suspension is positioned higher than a lowest one of the crankshaft, the main shaft, and the drive shaft.

9. The saddle type vehicle according to claim 1, wherein the air cleaner includes an exposed portion which is exposed from the frame when viewed from the side of the saddle type vehicle, and at least a portion of the exposed portion is wider than the frame in a vehicle width direction.

10. The saddle type vehicle according to claim 1, wherein at least a portion of the air cleaner is arranged above a front end portion of the rear suspension.

11. The saddle type vehicle according to claim 1, wherein at least a portion of the air cleaner is arranged behind the engine.

12. The saddle type vehicle according to claim 1, further comprising:
   a fuel tank positioned higher than the air cleaner; wherein
   at least a portion of the air cleaner is positioned rearward of the fuel tank.

13. The saddle type vehicle according to claim 1, further comprising:
   a battery arranged behind the air cleaner; and
   a seat arranged above the battery; wherein
   at least a portion of the air cleaner is positioned forward of the seat.

14. The saddle type vehicle according to claim 4, wherein the transmission case includes a case body and a bracket provided on the case body, and the bracket supports the front end portion of the rear suspension.

15. The saddle type vehicle according to claim 1, further comprising a link mechanism coupled to a rear end portion of the rear suspension and the swing-arm.

16. The saddle type vehicle according to claim 1, wherein a front end of the rear suspension is coupled to the engine, and the front end of the rear suspension does not overlap with the frame when viewed from the side of the saddle type vehicle.

17. The saddle type vehicle according to claim 1, wherein the rear suspension is directly coupled to the engine.

* * * * *